US012339956B2

(12) United States Patent
Shinde et al.

(10) Patent No.: US 12,339,956 B2
(45) Date of Patent: Jun. 24, 2025

(54) ENDPOINT ISOLATION AND INCIDENT RESPONSE FROM A SECURE ENCLAVE (71) Applicant: VMWARE, INC., Palo Alto, CA (US)

(72) Inventors: Sachin Shinde, Pune (IN); Mandar Nanivadekar, Pune (IN); Bharath Kumar Chandrasekhar, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 404 days.

(21) Appl. No.: 17/672,745

(22) Filed: Feb. 16, 2022

(65) Prior Publication Data
US 2023/0195890 A1 Jun. 22, 2023

(30) Foreign Application Priority Data
Dec. 22, 2021 (IN) .............................. 202141059949

(51) Int. Cl.
G06F 21/54 (2013.01)
G06F 21/55 (2013.01)
G06F 21/56 (2013.01)

(52) U.S. Cl.
CPC ............ G06F 21/554 (2013.01); G06F 21/54 (2013.01); G06F 21/566 (2013.01); G06F 2221/034 (2013.01)

(58) Field of Classification Search
CPC ...... G06F 21/554; G06F 21/54; G06F 21/566; G06F 2221/034
See application file for complete search history.

(56) References Cited

U.S. PATENT DOCUMENTS

| 10,033,759 | B1* | 7/2018 | Kabra | G06F 21/629 |
| 10,447,728 | B1* | 10/2019 | Steinberg | H04L 63/10 |
| 10,726,127 | B1* | 7/2020 | Steinberg | G06F 21/566 |
| 11,113,086 | B1* | 9/2021 | Steinberg | G06F 9/45558 |
| 2009/0044274 | A1* | 2/2009 | Budko | G06F 9/45558 718/1 |
| 2010/0325284 | A1* | 12/2010 | Heim | H04L 67/141 709/227 |
| 2013/0054948 | A1* | 2/2013 | Raj | G06F 21/575 713/2 |
| 2018/0083984 | A1* | 3/2018 | Frost | H04L 67/14 |
| 2019/0361724 | A1* | 11/2019 | McClure | G06F 9/4856 |

* cited by examiner

Primary Examiner — Daniel B Potratz
Assistant Examiner — Aidan Edward Shaughnessy
(74) Attorney, Agent, or Firm — Kim & Stewart LLP (57) ABSTRACT A method of protecting an endpoint against a security threat, wherein the endpoint includes an OS and a separate software entity included in memory pages of the endpoint, includes the steps of: preventing the OS from scheduling any tasks on vCPUs of the endpoint by transferring control of the vCPUs from the OS to the separate software entity; while the OS is prevented from scheduling any tasks on the vCPUs, scanning, by the separate software entity, at least one of a list of processes of the endpoint and a subset of the memory pages of the endpoint, and upon receiving an identification of a malicious process, terminating, by the separate software entity, the malicious process; and after the separate software entity terminates the malicious process, allowing the OS to schedule tasks on the vCPUs by transferring control of the vCPUs from the separate software entity to the OS.

24 Claims, 5 Drawing Sheets

ENDPOINT ISOLATION AND INCIDENT RESPONSE FROM A SECURE ENCLAVE

RELATED APPLICATION

Benefit is claimed under 35 U.S.C. 119(a)-(d) to Foreign Application Serial No. 202141059949 filed in India entitled "ENDPOINT ISOLATION AND INCIDENT RESPONSE FROM A SECURE ENCLAVE", on Dec. 22, 2021, by VMware, Inc., which is herein incorporated in its entirety by reference for all purposes.

BACKGROUND

There exists a wide array of solutions for responding to malware attacks, such attacks involving unauthorized actions being performed on a victim's computer system. Some incident-response (IR) solutions offer cloud-based response capabilities in which administrators remotely communicate with agents that are running in the computer system. Using a simulated shell environment with a command-line interface (CLI), administrators isolate, infected computers by stopping their network activity except for that between the agents and the administrators. Additionally, through the CLI, administrators remediate threats by terminating malicious processes.

However, responding to such incidents remotely may not provide protection in certain cases. First, sophisticated malware has been developed that hijacks the agents' activities including the networking activities thereof, which prevents the administrators from transmitting a response to the agents altogether. Second, even if the administrators are able to transmit a response, some malware tracks commands that the agents execute. By tracking these commands, such malware learns the remediation behavior to make future attacks more difficult to neutralize. Third, establishing a network connection between agents and the cloud in order to transmit the response may take a long time. During that time, the malware may be able to complete its unauthorized activities and destroy any evidence. A solution that can be used for isolating a computer system and responding to incidents and that is impervious to the above-mentioned behaviors of sophisticated malware is needed.

SUMMARY

Accordingly, one or more embodiments provide a method of protecting an endpoint against a security threat detected at the endpoint, wherein the endpoint includes an operating system (OS) and a separate software entity included in memory pages of the endpoint. The method includes the steps of: preventing the OS from scheduling any tasks on virtual CPUs (vCPUs) of the endpoint by transferring control of the vCPUs from the OS to the separate software entity; while the OS is prevented from scheduling any tasks on the vCPUs, scanning, by the separate software entity, at least one of a list of processes of the endpoint and a subset of the memory pages of the endpoint, and upon receiving an identification of a malicious process, the identification of the malicious process being determined from the at least one of the list of processes and the subset of the memory pages of the endpoint, terminating, by the separate software entity, the malicious process; and after the separate software entity terminates the malicious process, allowing the OS to schedule tasks on the vCPUs by transferring control of the vCPUs from the separate software entity to the OS.

Further embodiments include a non-transitory computer-readable storage medium comprising instructions that cause a computer system to carry out the above method, as well as a computer system configured to carry out the above method.

DETAILED DESCRIPTION

Techniques for protecting an endpoint, e.g., a VM, in response to a security attack are described. The techniques involve utilizing a "guest monitor," which is a software entity of the VM that can access memory pages allocated to the VM. Like an agent running inside the VM, the guest monitor may be utilized to provide cloud-based IR. However, unlike the agent, when the VM is launched, the guest monitor is loaded into a portion of VM memory that is inaccessible to an operating system (OS) of the VM. As such, the guest monitor can execute remediation-related commands from a secure enclave of the VM that is inaccessible to malware executing inside the VM. Such malware thus cannot prevent a cloud-based server from transmitting a response to the guest monitor and cannot observe the guest monitor's behavior. Furthermore, for even faster IR, a local security appliance instead of the cloud-based server may transmit a response to the guest monitor.

Whenever the guest monitor is awakened, control over vCPUs of the VM are transferred from the OS to the guest monitor, which effectively "freezes" the guest OS and any malware executing in the VM. The VM is thus isolated whenever its guest monitor is awakened. Depending on the frequency at which its guest monitor is awakened, a compromised VM may be isolated significantly faster than with prior art solutions that require first establishing a network connection between the compromised VM and the cloud for isolation. While the VM is isolated, the guest monitor can remediate the VM to prevent the malware from continuing its unauthorized activities. These and further aspects of the invention are discussed below with respect to the drawings.

Figure 1:
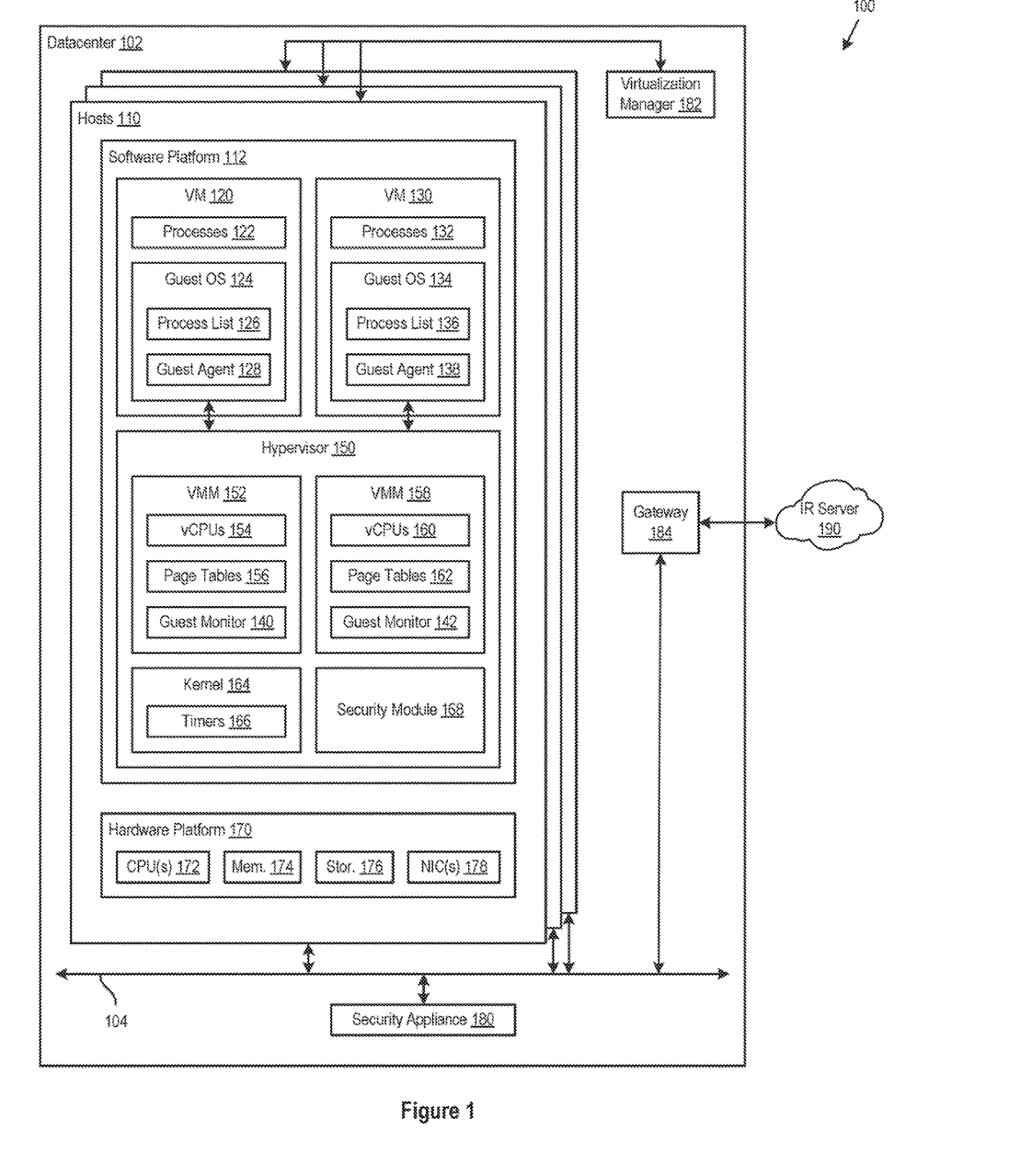
FIG. 1 is a block diagram of a virtualized computer system in which embodiments may be implemented.

FIG. 1 is a block diagram of a virtualized computer system 100 in which embodiments may be implemented. Virtualized computer system 100 includes a cluster of hosts 110, a security appliance 180, and a virtualization manager 182 executing in a data center 102, and an IR server 190 executing remotely. Data center 102 may be an on-premise data center that is controlled and administrated by a particular enterprise or business organization. Data center 102 may also be a cloud data center that is operated by a cloud computing service provider. IR server 190 is administrated from outside data center 102 to remotely respond to incidents (e.g., security attacks) in hosts 110. Although FIG. 1 depicts a single datacenter with hosts executing therein, other embodiments utilize a hybrid model including both an on-premise datacenter and a cloud datacenter. In such a hybrid model, the on-premise datacenter includes hosts executing therein, and the cloud datacenter includes a cloud management platform that controls software executing on the hosts of the on-premise data center.

Each host 110 is constructed on a server grade hardware platform 170 such as an x86 architecture platform. Hardware platform 170 includes conventional components of a computing device, such as one or more central processing units (CPUs) 172, system memory 174 such as random-access memory (RAM), local storage 176 such as one or more hard disk drives (HDDs) or solid-state drives (SSDs), and one or more network interface cards (NICs) 178. CPU(s) 172 are configured to execute instructions such as executable instructions that perform one or more operations described herein, such executable instructions being stored in system memory 174. Local storage 176 of hosts 110 may optionally be aggregated and provisioned as a virtual storage area network (vSAN). NIC(s) 178 enable hosts 110 to communicate with each other and with other devices over a physical network 104.

Each hardware platform 170 supports a software platform 112. Software platform 112 includes a hypervisor 150, which is a virtualization software layer that abstracts hardware resources of hardware platform 170 for concurrently running VMs such as VMs 120 and 130. One example of a hypervisor 150 that may be used is a VMware ESX® hypervisor by VMware, Inc. Although the disclosure is described with reference to VMs, the teachings herein also apply to other types of virtual computing instances such as containers, Docker® containers, data compute nodes, isolated user space instances, and the like that may be attacked by malware and that thus require isolation and remediation.

VMs 120 and 130 execute processes 122 and 132, which are respectively supported by guest operating systems (OSs) 124 and 134. Each guest OS includes a process list 126 or 136, which is a data structure such as a linked list capturing information about processes running in the respective VMs. For example, process lists 126 and 136 may include the names and memory usage of running processes along with those of any threads executing therein.

Each guest OS further includes a guest agent 128 or 138 for collecting information about the respective guest OSs such as memory offsets of respective process lists. Guest agents 128 and 138 may directly communicate with IR server 190 to allow for remote monitoring, isolation, and remediation of VMs 120 and 130. On the other hand, according to embodiments, to thwart sophisticated malware, guest agents 128 and 138 share information with guest monitors 140 and 142, respectively, including the memory offsets of the respective process lists. Specifically, each guest agent shares the information with a hypervisor kernel 164, which forwards the information to the respective guest monitors. Guest monitors 140 and 142 and kernel 164 and are discussed further below.

Hypervisor 150 includes virtual machine monitors (VMMs) 152 and 158, kernel 164, and a security module 168. VMMs 152 and 158 implement the virtual system support needed to coordinate operations between hypervisor 150 and VMs 120 and 130, respectively. Each VMM manages a virtual hardware platform for a corresponding VM. Such a virtual hardware platform includes emulated hardware such as vCPUs 154 or 160 and guest physical memory. Each VMM further includes nested page tables 156 or 162 for translating virtual addresses of a corresponding VM to physical addresses of system memory 174. Each VMM also includes guest monitor 140 or 142 for its respective VM.

Guest monitors 140 and 142 are software entities that reside in the memory spaces of VMs 120 and 130, respectively. However, guest monitors 140 and 142 specifically reside in memory pages that are made inaccessible to guest OSs 124 and 134, i.e., in secure enclaves of VMs 120 and 130. Resultingly, guest monitors 140 and 142 can access all the memory pages allocated to VMs 120 and 130, respectively. However, all other processes of VMs 120 and 130 can only access a subset of such pages, i.e., the pages that are allocated to VMs 120 and 130 minus the pages in which guest monitors 140 and 142 reside. Although embodiments are described with respect to guest monitors 140 and 142, in other embodiments, other components including kernel 164 may instead be used to monitor VMs 120 and 130 and provide IR to threats therein.

Kernel 164 provides OS functionalities such as file system, process creation and control, and process threads. Kernel 164 also provides scheduling of CPU(s) 172 and system memory 174 across VMs 120 and 130, VMMs 152 and 158, and security module 168. Kernel 164 includes timers 166, one for guest OS 124 and guest monitor 140 and another for guest OS 134 and guest monitor 142. When one of timers 166 expires, kernel 164 "freezes" the corresponding guest OS by saving a state of the guest OS from registers of the corresponding VM's vCPUs and transferring control of the vCPUs to the corresponding guest monitor. The guest monitor can then execute commands (if any have been provided to the guest monitor). Such commands may include scanning the VM's process list and/or the VM's memory pages, terminating a malicious process, executing a new process, and writing to and executing remediation actions of an executable file. After the guest monitor executes its commands (if any), kernel 164 repopulates the registers of the VM's vCPUs with their saved state, transfers control of the vCPUs back to the guest OS, and restarts timer 166.

It should be noted that because guest OSs 124 and 134 are unaware of the presence of guest monitors 140 and 142, when there has not been an incident, kernel 164 only briefly takes control of vCPUs away from a guest OS. For example, the total time during which kernel 164 takes control away from the guest OS may be approximately equal to the amount of time it takes for the corresponding guest monitor to transmit a packet to security appliance 180 (or IR server 190) plus the amount of time it takes for security appliance 180 (or IR server 190) to transmit a packet back to the guest monitor. As such, vCPUs 154 and 160 still appear to be "alive" from the perspective of guest OSs 124 and 134 despite brief intervals of apparent vCPU inactivity. Consequently, when control is transferred from a guest monitor back to a guest OS, the vCPUs appear to the guest OS to be functioning normally such that it is unnecessary for the guest OS to execute any recovery mechanisms.

Security module 168 connects to guest monitors 140 and 142 and to security appliance 180. Security module 168 thus acts as a bridge between guest monitor 140 and security appliance 180 and between guest monitor 142 and security appliance 180. Security appliance 180 may be a computer program that resides and executes in a central server of data center 102 or a VM executing in one of hosts 110. For local IR, an administrator can monitor and remediate VMs of hosts 110 directly from security appliance 180. Otherwise, security appliance 180 further connects to IR server 190, thus acting as a bridge between security module 168 of each host 110 and IR server 190. IR server 190 is a cloud-controlled server through which an administrator monitors and remediates VMs of hosts 110 from outside data center 102.

Virtualization manager 182 communicates with hosts 110 via a management network (not shown) to perform administrative tasks such as managing hosts 110, provisioning and managing VMs 120 and 130, migrating VMs from one of hosts 110 to another, and load balancing between hosts 110. Virtualization manager 182 may be a computer program that resides and executes in a central server of data center 102 or a VM executing in one of hosts 110. One example of virtualization manager 182 is the VMware vCenter Server® by VMware, Inc.

Gateway 184 provides VMs 120 and 130, security appliance 180, and other devices in data center 102 with connectivity to an external network, e.g., the Internet. Communication between devices in data center 102 and IR server 190 are thus facilitated by gateway 184. Gateway 184 manages public internet protocol (IP) addresses for VMs 120 and 130 and security appliance 180 and routes traffic incoming to and outgoing from data center 102. Gateway 184 may also provide networking services such as firewalls, network address translation (NAT), dynamic host configuration protocol (DHCP), load balancing, and virtual private network (VPN) connectivity over the external network. Gateway 184 may be a computer program that resides and executes in a central server of data center 102 or a VM executing in one of hosts 110.

Figure 2A:
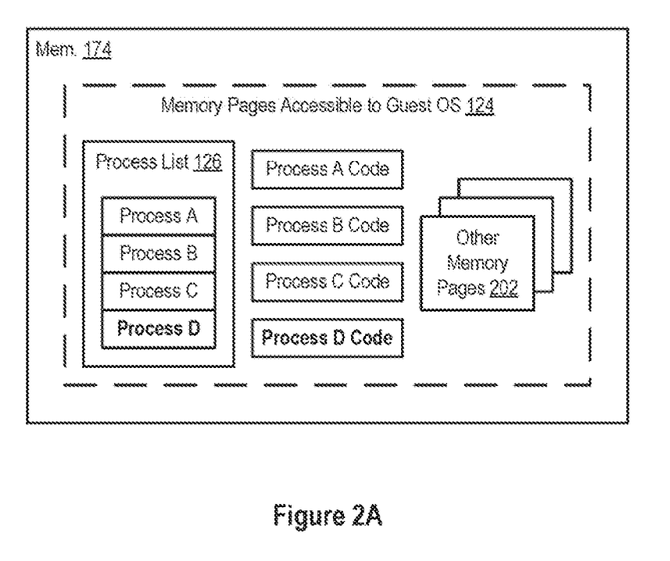
FIG. 2A is a system diagram illustrating an example of memory pages accessible to a guest OS of a VM after an incident.

FIG. 2A is a system diagram illustrating an example of memory pages accessible to guest OS 124, after an incident. In the example of FIG. 2A, guest OS 124 is supporting four processes: A, B, C, and D, process D being malicious. As such, system memory 174 includes the code of each process, and process list 126 lists each of the processes. The memory space of VM 120 further includes any other memory pages 202 that are accessible to guest OS 124, which may include evidence of the unauthorized activities of malicious process D.

Figure 2B:
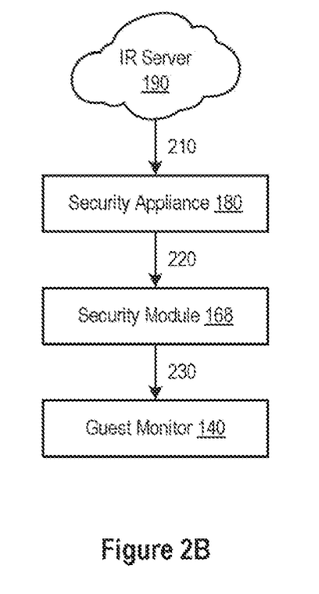
FIG. 2B is a system diagram illustrating an example of remotely transmitting at least one command in response to the incident.

FIG. 2B is a system diagram illustrating an example of remotely transmitting at least one command in response to the incident of FIG. 2A. The steps of FIG. 2B are performed after guest OS 124 has been "frozen" such that process D cannot continue its unauthorized activity. Control over vCPUs 154 have accordingly been transferred from guest OS 124 to guest monitor 140. At step 210, IR server 190 transmits the command(s) to security appliance 180. Such transmission may be executed by the administrator of IR server 190, or such transmission may be executed automatically by IR server 190 in response to the incident. At step 220, security appliance 180 forwards the command(s) to security module 168 in hypervisor 150.

Finally, at step 230, security module 168 forwards the command(s) to guest monitor 140. Guest monitor 140 can then execute the command(s) on system memory 174 and/or local storage 176, as discussed further below in conjunction with FIGS. 2C-2F. As mentioned earlier, for faster IR response, an administrator may provide IR directly from security appliance 180. In such a case, step 210 is not needed, and security appliance 180 can transmit at least one command to security module 168 without IR server 190.

Figure 2C:
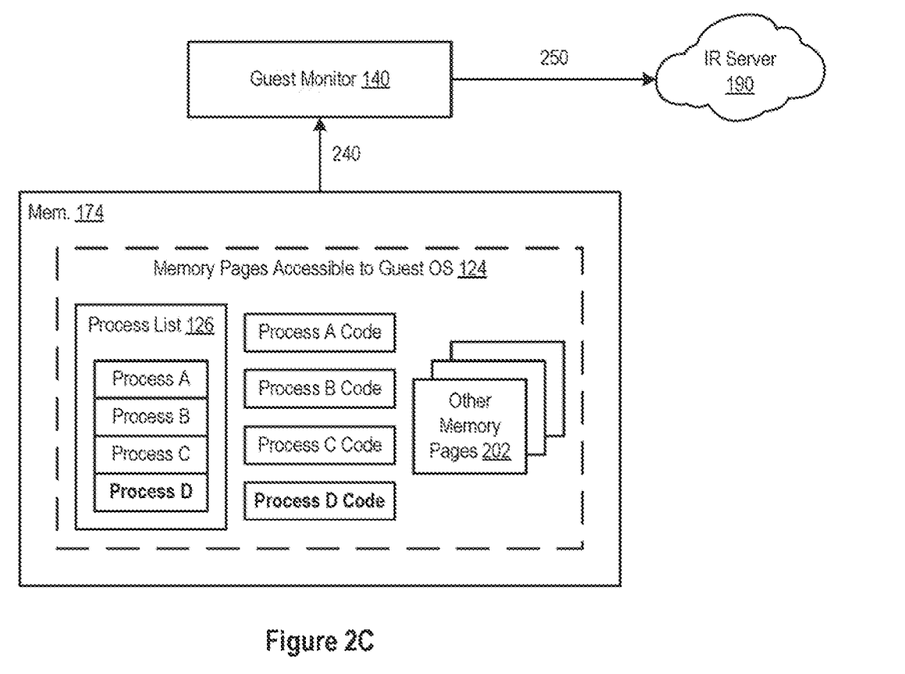
FIG. 2C is a system diagram illustrating the scanning of memory of the compromised VM.

FIG. 2C is a system diagram illustrating the scanning of the memory space of compromised VM 120. Such scanning of memory is an example of a command that may be transmitted by IR server 190 as part of the remediation process. At step 240, guest monitor 140 scans process list 126 and/or other memory pages 202 accessible to guest OS 124. Specifically, guest monitor 140 "walks" nested page tables 156 of hypervisor 150 to translate virtual addresses of VM 120 to physical addresses of system memory 174 and accesses the memory pages at the translated physical addresses. At step 250, guest monitor 140 transmits the scanned data to IR server 190 via security module 168 and security appliance 180. The scanned data may then be analyzed by the administrator of IR server 190 or automatically by IR server 190 to identify process D and determine a remediation command for neutralizing the threat. On the other hand, in the case of a local IR response, guest monitor 140 may merely transmit the scanned data to security appliance 180 via security module 168 for such analysis.

Figure 2D:
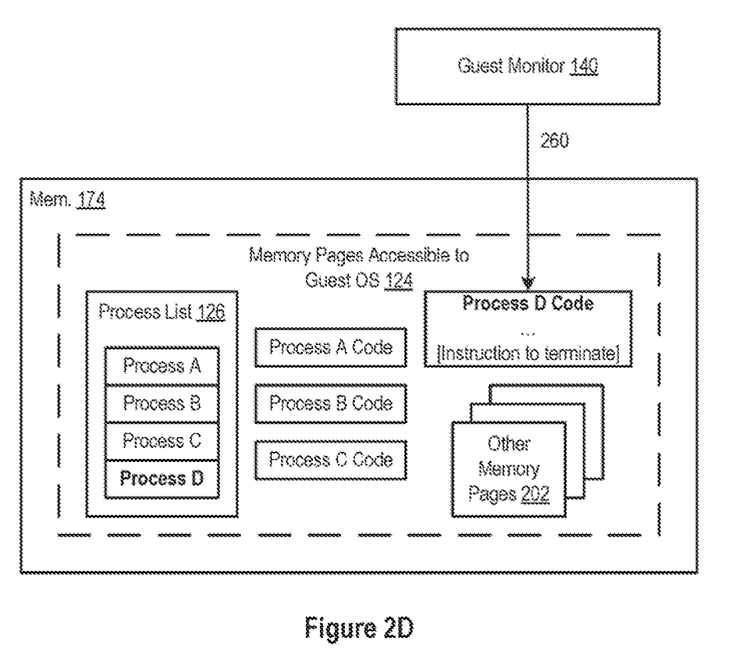
FIG. 2D is a system diagram illustrating dynamically instructing a malicious process of the compromised VM to terminate.

FIG. 2D is a system diagram illustrating dynamically instructing malicious process D of compromised VM 120 to terminate, which is an example of a remediation command that may be transmitted by IR server 190 and/or security appliance 180. At step 260, guest monitor 140 locates the current instruction pointer of process D, which is saved in system memory 174 when guest OS 124 is frozen. Guest monitor 140 then dynamically inserts an instruction to terminate at the current instruction pointer. As such, when control over vCPUs 154 is transferred from guest monitor 140 back to guest OS 124, process D executes the instruction to terminate.

Figure 2E:
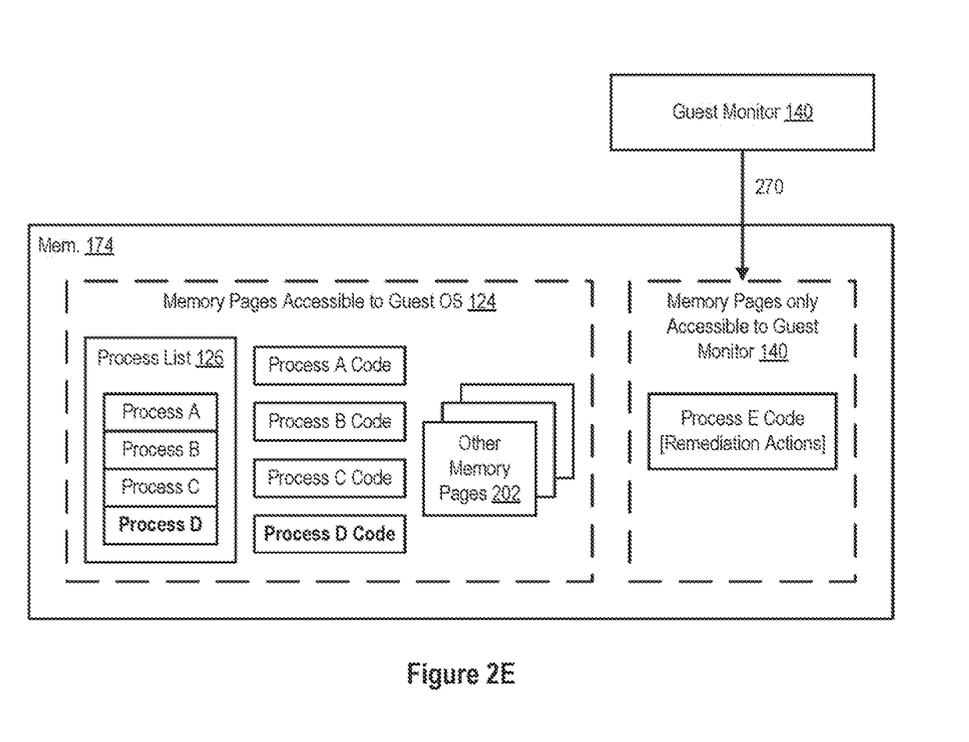
FIG. 2E is a system diagram illustrating executing a process to remediate the compromised VM.

FIG. 2E is a system diagram illustrating executing a process E to remediate compromised VM 120, which is another example of a remediation command that may be transmitted by IR server 190 and/or security appliance 180. At step 270, guest monitor 140 executes process E, which executes one or more remediation actions, such remediation actions including: (1) terminating process D; (2) reverting code that was altered by process D; (3) reverting network setting changes performed by process D; and (4) reverting other configuration changes performed by process D.

Figure 2F:
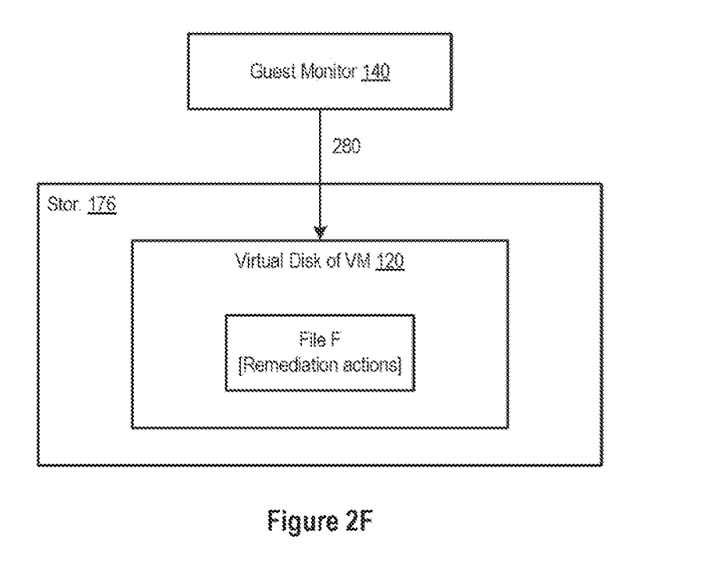
FIG. 2F is a system diagram illustrating writing to a file to remediate the compromised VM.

FIG. 2F is a system diagram illustrating creating an executable file to remediate compromised VM 120, which is another example of a remediation command that may be transmitted by IR server 190 and/or security appliance 180. At step 280, guest monitor 140 creates a file F in the virtual disk of VM 120, the file F including one or more remediation actions. Such remediation actions include those described in conjunction with FIG. 2E. Guest monitor 140 then executes the remediation actions of file F to neutralize the incident.

Figure 3:
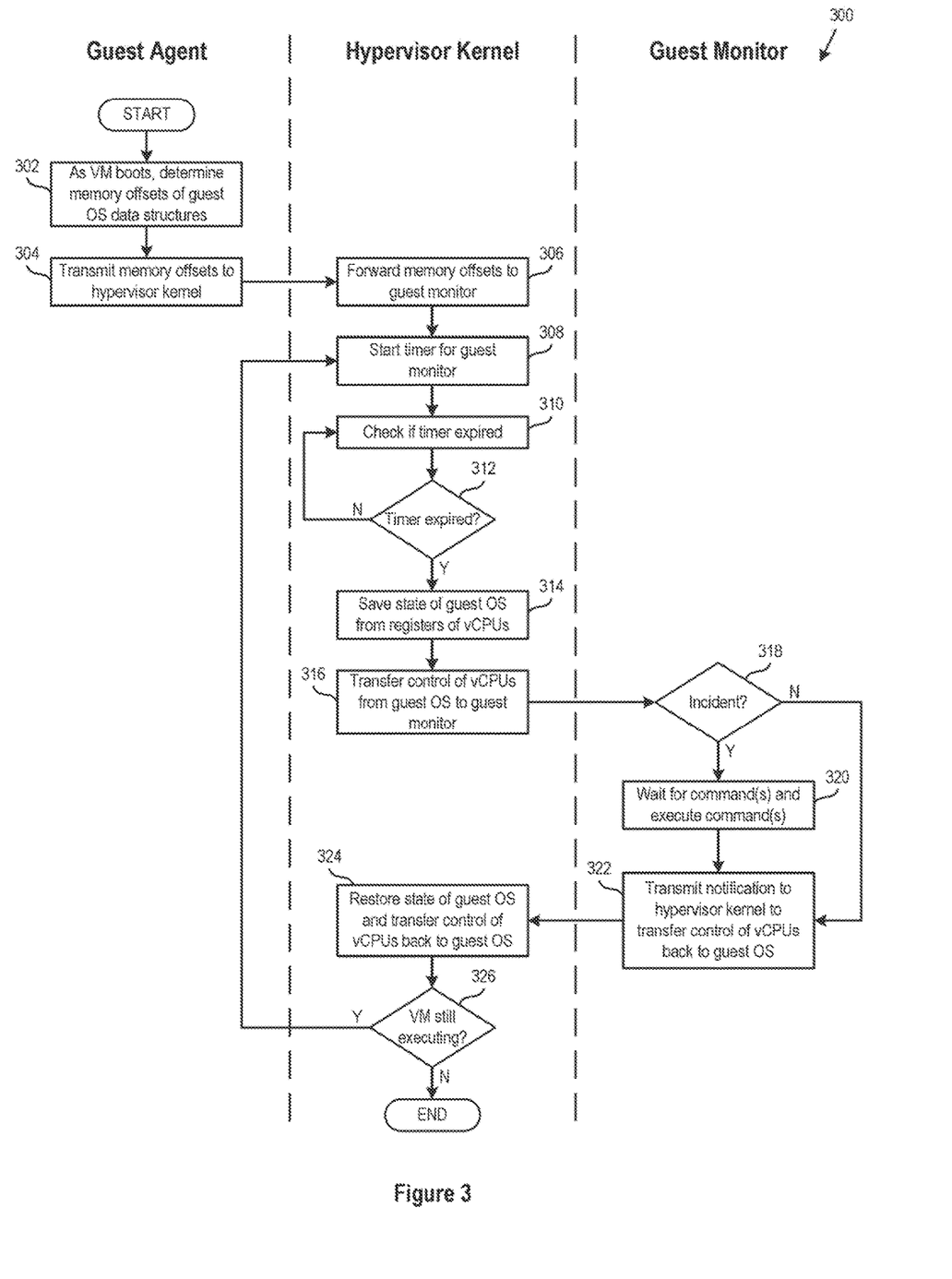
FIG. 3 is a flow diagram of steps carried out by a guest agent, hypervisor kernel, and guest monitor to carry out a method of initializing the guest monitor to periodically execute during the lifecycle of a VM, according to an embodiment.

FIG. 3 is a flow diagram of steps carried out by guest agent 128, hypervisor kernel 164, and guest monitor 140 to carry out a method 300 of initializing guest monitor 140 to periodically execute during the lifecycle of VM 120, according to an embodiment. At step 302, VM 120 begins booting, and as VM 120 boots, guest agent 128 determines the memory offsets of memory pages at which guest OS 124 data structures such as process list 126 are stored. At step 304, guest agent 128 transmits the memory offsets to kernel 164. At step 306, kernel 164 detects the memory offsets and forwards the offsets to guest monitor 140. Guest monitor 140 can later use the offsets to scan data structures such as process list 126 in response to an incident.

At step 308, kernel 164 starts timer 166 corresponding to VM 120 by setting timer 166 to expire after a specified time interval elapses. The time interval can be predetermined such that it is the same each time kernel 164 starts timer 166. The time interval can also be determined at run time by, e.g., guest monitor 140, security appliance 180, or IR server 190. For example, kernel 164 may start timer 166 to expire after one second. Later, an incident may be detected that requires remediation. In response, after the incident is remediated and any malicious process(es) are terminated, one of guest monitor 140, security appliance 180, and IR server 190 may instruct kernel 164 to update the time interval to a shorter time interval such as 250 milliseconds. In this case, the next time method 300 returns to step 308, kernel 164 sets timer 166 to expire after 250 milliseconds instead of 1 second.

At step 310, kernel 164 checks if timer 166 expired. At step 312, if timer 166 has not expired, method 300 returns to step 310, and kernel 164 checks again if timer 166 has expired. Once timer 166 expires, method 300 moves to step 314, and kernel 164 begins the process of freezing guest OS 124. At step 314, kernel 164 saves the state of guest OS 124 from registers of vCPUs 154, to system memory 174. At step 316, kernel 164 transfers control of vCPUs 154 from guest OS 124 to guest monitor 140, thus preventing guest OS 124 from scheduling any tasks on vCPUs 154. After step 316, guest OS 124 is frozen. By extension, any malware executing in VM 120 is similarly frozen, and guest OS 124 cannot schedule any tasks originating from such malware.

At step 318, if there is an incident, method 300 moves to step 320. At step 320, guest monitor 140 waits for at least one command from IR server 190 and/or security appliance 180. Once guest monitor 140 receives the command(s), guest monitor 140 executes the command(s). For example, in response to a received command, guest monitor 140 may scan process list 126 and/or the contents of other memory pages accessible to guest OS 124, as discussed above in conjunction with FIG. 2C. Guest monitor 140 may also dynamically instruct a malicious process of VM 120 to terminate, as discussed above in conjunction with FIG. 2D. Guest monitor 140 may also execute a process to remediate VM 120, as discussed above in conjunction with FIG. 2E. Guest monitor 140 may also create a file in local storage 176 and execute remediation actions therein, as discussed above in conjunction with FIG. 2F.

Returning to step 318, if there is not an incident, method 300 moves to step 322. At step 322, guest monitor 140 transmits a notification to kernel 164 to transfer control of vCPUs 154 back to guest OS 124. At step 324, kernel 164 restores the state of guest OS 124 to vCPUs 154 and transfers control of vCPUs 154 from guest monitor 140 back to guest OS 124. Guest OS 124 is thus no longer frozen and can schedule tasks on vCPUs 154. It should be noted that if there was no incident at step 318, the time interval between step 316, at which control of vCPUs 154 was transferred to guest monitor 140, and step 324, at which control of vCPUs 154 was transferred back to guest OS 124, is brief. As such, vCPUs 154 continue appearing to be alive from the perspective of guest OS 124. At step 326, if VM 120 is still executing, method 300 returns to step 308 and kernel 164 again starts timer 166 corresponding to VM 120. Otherwise, if VM 120 is finished executing, method 300 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of protecting a virtual machine (VM) executing on a hypervisor against a security threat detected at the VM, wherein memory pages in a memory space of the VM include memory for both a guest operating system (OS) of the VM and for a software entity of the VM that is separate from the guest OS, the method comprising:
preventing, by the hypervisor, the quest OS from scheduling any tasks on virtual CPUs (vCPUs) of the VM by saving a state of the guest OS from registers of the vCPUs and transferring control of the vCPUs from the guest OS to the separate software entity to enable the separate software entity to schedule tasks thereon, wherein the hypervisor manages the vCPUs;
while the guest OS is prevented from scheduling any tasks on the vCPUs;
scanning, by the separate software entity, at least one of a list of processes of the VM and a subset of the memory pages of the VM; and
upon receiving an identification of a malicious process, the identification of the malicious process being determined from the at least one of the list of processes and the subset of the memory pages of the VM, terminating the malicious process by the separate software entity; and
after the separate software entity terminates the malicious process, enabling by the hypervisor, the guest OS to schedule tasks on the vCPUs by repopulating the registers of the vCPUs with the saved state of the guest OS and transferring control of the vCPUs from the separate software entity back to the guest OS.

2. The method of claim 1, further comprising:
loading the separate software entity into a portion of the memory space of the VM that is inaccessible to the guest OS and the malicious process.

3. The method of claim 1, wherein the identification of the malicious process is received from a cloud server that is outside of a data center in which the VM executes, and the cloud server identifies the malicious process from the at least one of the list of processes and the subset of the memory pages of the VM.

4. The method of claim 1, wherein terminating the malicious process involves dynamically inserting instructions into code of the malicious process.

5. The method of claim 1, wherein terminating the malicious process involves starting and executing a new process at the VM.

6. The method of claim 1, wherein terminating the malicious process involves creating an executable file and executing commands of the executable file.

7. The method of claim 1, further comprising:
after transferring control of the vCPUs back to the guest OS, transferring, by the hypervisor, control of the vCPUs from the guest OS to the separate software entity again to be used by the separate software entity again for scheduling tasks; and
after transferring control of the vCPUs to the separate software entity again, transferring, by the hypervisor, control of the vCPUs from the separate software entity back to the guest OS again to be used by the quest OS again for scheduling tasks, to cause the vCPUs to appear to the guest OS to be functioning normally and prevent the guest OS from executing recovery mechanisms.

8. The method of claim 1, wherein the hypervisor transfers control of the vCPUs to the separate software entity in response to a timer expiring after a first time interval elapses, the method further comprising:
in response to the separate software entity terminating the malicious process, setting, by the hypervisor, the timer to expire after a second time interval elapses, wherein the second time interval is shorter than the first time interval.

9. A non-transitory computer readable medium comprising instructions that are executable in a computer system, wherein the instructions when executed cause the computer system to carry out a method of protecting a virtual machine (VM) executing on a hypervisor against a security threat detected at the VM, wherein memory pages in a memory space of the VM include memory for both a guest operating system (OS) of the VM and for a software entity of the VM that is separate from the guest OS, the method comprising:
preventing, by the hypervisor, the guest OS from scheduling any tasks on virtual CPUs (vCPUs) of the VM by saving a state of the guest OS from registers of the vCPUs and transferring control of the vCPUs from the guest OS to the separate software entity to enable the separate software entity to schedule tasks thereon, wherein the hypervisor manages the vCPUs;
while the guest OS is prevented from scheduling any tasks on the vCPUs:
scanning, by the separate software entity, at least one of a list of processes of the VM and a subset of the memory pages of the VM; and
upon receiving an identification of a malicious process, the identification of the malicious process being determined from the at least one of the list of processes and the subset of the memory pages of the VM, terminating the malicious process by the separate software entity; and
after the separate software entity terminates the malicious process, enabling, by the hypervisor, the quest OS to schedule tasks on the vCPUs by repopulating the registers of the vCPUs with the saved state of the guest OS and transferring control of the vCPUs from the separate software entity back to the guest OS.

10. The non-transitory computer readable medium of claim 9, the method further comprising:
loading the separate software entity into a portion of the memory space of the VM that is inaccessible to the guest OS and the malicious process.

11. The non-transitory computer readable medium of claim 9, wherein the identification of the malicious process is received from a cloud server that is outside of a data center in which the VM executes, and the cloud server identifies the malicious process from the at least one of the list of processes and the subset of the memory pages of the VM.

12. The non-transitory computer readable medium of claim 9, wherein terminating the malicious process involves dynamically inserting instructions into code of the malicious process.

13. The non-transitory computer readable medium of claim 9, wherein terminating the malicious process involves starting and executing a new process at the VM.

14. The non-transitory computer readable medium of claim 9, wherein terminating the malicious process involves creating an executable file and executing commands of the executable file.

15. The non-transitory computer readable medium of claim 9, the method further comprising:

after transferring control of the vCPUs back to the guest OS, transferring, by the hypervisor, control of the vCPUs from the guest OS to the separate software entity again to be used by the separate software entity again for scheduling tasks; and after transferring control of the vCPUs to the separate software entity again, transferring, by the hypervisor, control of the vCPUs from the separate software entity back to the guest OS again to be used by the guest OS again for scheduling tasks, to cause the vCPUs to appear to the guest OS to be functioning normally and prevent the guest OS from executing recovery mechanisms.

16. The non-transitory computer readable medium of claim 9, wherein the hypervisor transfers control of the vCPUs to the separate software entity in response to a timer expiring after a first time interval elapses, the method further comprising:

in response to the separate software entity terminating the malicious process, setting, by the hypervisor, the timer to expire after a second time interval elapses, wherein the second time interval is shorter than the first time interval.

17. A host computer including a processor and memory, wherein the processor executes instructions stored in the memory to protect a virtual machine (VM) executing on a hypervisor against a security threat detected at the VM, wherein memory pages in a memory space of the VM include memory for both a guest operating system (OS) of the VM and for a software entity of the VM that is separate from the guest OS, by performing the following steps:

preventing, by the hypervisor, the guest OS from scheduling any tasks on virtual CPUs (vCPUs) of the VM by saving a state of the guest OS from registers of the vCPUs and transferring control of the vCPUs from the guest OS to the separate software entity to enable the separate software entity to schedule tasks thereon, wherein the hypervisor manages the vCPUs;

while the guest OS is prevented from scheduling any tasks on the vCPUs:

scanning, by the separate software entity, at least one of a list of processes of the VM and a subset of the memory pages of the VM; and upon receiving an identification of a malicious process, the identification of the malicious process being determined from the at least one of the list of processes and the subset of the memory pages of the VM, terminating the malicious process by the separate software entity; and after the separate software entity terminates the malicious process, enabling, by the hypervisor the guest OS to schedule tasks on the vCPUs by repopulating the registers of the vCPUs with the saved state of the guest OS and transferring control of the vCPUs from the separate software entity back to the guest OS.

18. The host computer of claim 17, wherein the steps further include:

loading the separate software entity into a portion of the memory space of the VM that is inaccessible to the guest OS and the malicious process.

19. The host computer of claim 17, wherein the identification of the malicious process is received from a cloud server that is outside of a data center in which the VM executes, and the cloud server identifies the malicious process from the at least one of the list of processes and the subset of the memory pages of the VM.

20. The host computer of claim 17, wherein terminating the malicious process involves dynamically inserting instructions into code of the malicious process.

21. The host computer of claim 17, wherein terminating the malicious process involves starting and executing a new process at the VM.

22. The host computer of claim 17, wherein terminating the malicious process involves creating an executable file and executing commands of the executable file.

23. The host computer of claim 17, wherein the steps further include:

after transferring control of the vCPUs back to the guest OS, transferring, by the hypervisor, control of the vCPUs from the guest OS to the separate software entity again to be used by the separate software entity again for scheduling tasks; and after transferring control of the vCPUs to the separate software entity again, transferring, by the hypervisor, control of the vCPUs from the separate software entity back to the guest OS again to be used by the guest OS again for scheduling tasks, to cause the vCPUs to appear to the guest OS to be functioning normally and prevent the guest OS from executing recovery mechanisms.

24. The host computer of claim 17, wherein the hypervisor transfers control of the vCPUs to the separate software entity in response to a timer expiring after a first time interval elapses, and wherein the steps further include:

in response to the separate software entity terminating the malicious process, setting, by the hypervisor, the timer to expire after a second time interval elapses, wherein the second time interval is shorter than the first time interval.

* * * * *